United States Patent [19]

Martin

[11] Patent Number: 5,038,133
[45] Date of Patent: Aug. 6, 1991

[54] SIMULATED VEHICLE ALARM
[76] Inventor: Charles Martin, 25888 Madeline La., Hayward, Calif. 94545
[21] Appl. No.: 525,856
[22] Filed: May 21, 1990
[51] Int. Cl.⁵ .............................................. G08B 5/38
[52] U.S. Cl. .................................. 340/438; 340/425.5; 340/426; 307/10.8
[58] Field of Search ............... 340/438, 426, 425.5, 340/457, 457.2, 428, 429; 307/10.8; 362/95, 61

[56] References Cited
U.S. PATENT DOCUMENTS 4,710,745 12/1987 del Rosario ...................... 340/428
4,796,002 1/1989 Heidman, Jr. ...................... 340/428
4,866,417 9/1989 Defino et al. ...................... 340/429
4,972,172 11/1990 McLaughlin ...................... 340/425.5

Primary Examiner—Donnie L. Crosland
Assistant Examiner—Brian R. Tumm
Attorney, Agent, or Firm—Linval B. Castle

[57] ABSTRACT

A simulated auto theft alarm in which a LED mounted in a vehicle instrument panel is coupled to a simple circuit that causes the LED to flash at a rate comparable to those of conventional auto alarm systems whenever the ignition is OFF and to remain OFF whenever the ignition is ON.

5 Claims, 1 Drawing Sheet

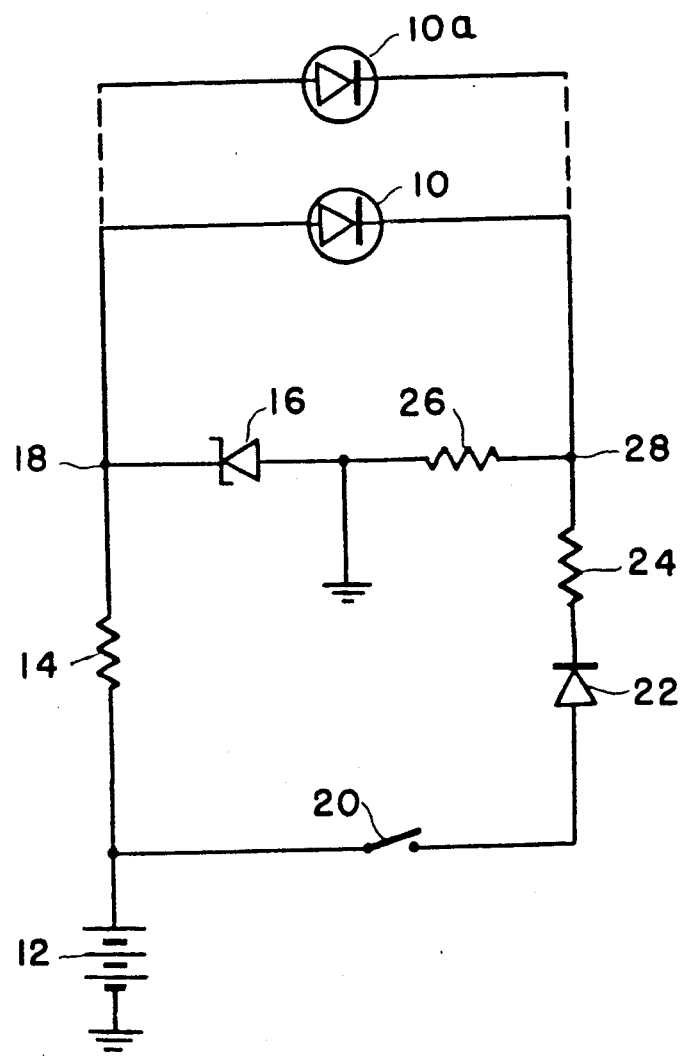

SIMULATED VEHICLE ALARM

BACKGROUND OF THE INVENTION

This invention relates to vehicle alarms or antitheft systems and particularly to a thief-thwarting alarm "on" indicator to be installed in the cab of a vehicle without an actual alarm system.

Modern auto vehicles and the accessories purchased and installed in them are often extremely expensive and are the subjects of easy theft when the vehicles are parked in remote or public parking areas. To protect against such thefts, many owners are installing in their vehicles alarm systems that, when armed, will generate a signal or sound a loud audible alarm whenever a sensor unit is triggered. These alarm systems are generally armed by a radio controlled switch remotely operable several hundred feet from the vehicle and its armed condition is usually indicated by a small light that may be mounted on the vehicle instrument panel or in each front door panel where its flashing can easily be seen by the vehicle owner, or by anyone else looking into the vehicle.

Potential car thieves looking for cars or their valuable contents are well acquainted with alarm systems and also check for flashing lights in the vehicle for an indication of the presence of an alarm system. A flashing light will turn them away.

The invention to be described is for an alarm system simulator which comprises an oscillator driven lamp coupled to the vehicle battery and to the ignition switch. The lamp, a low current LED mounted in the vehicle instrument panel, is OFF whenever the vehicle ignition switch is ON, and flashes whenever the ignition if OFF, thus discouraging potential car thieves.

DESCRIPTION OF THE DRAWING

The single drawing is a schematic circuit diagram of the preferred embodiment of the simulated vehicle alarm.

DETAILED DESCRIPTION

The circuitry of the simulated alarm is intended to drive one light emitting diode (LED) 10 which becomes conductive between 2-5 volts D.C. and which preferably is mounted in a small hole in the instrument panel of the vehicle in which the alarm is installed. The circuitry is capable of driving two or three such LEDs in parallel and a second is shown by dashed lines if it is desired to install the LEDs in both door panels of the vehicle.

As previously mentioned, LED 10 is driven by the 12 volt vehicle battery 12, the positive terminal of which is coupled through a resistor 14 to the cathode of a Zener diode 16 whose anode is grounded. The Zener diode 16 is preferably a type 1N4736 having a breakdown voltage of 6.9 volts so that the junction 18 between resistor 14 and Zener diode 16 will normally be at a constant 6.9 volts.

The ignition switch 20 of the vehicle in which the alarm is installed is coupled to the positive terminal of the vehicle battery 12. The anode of a small diode 22 is coupled to the output terminal of the switch 20 to pass current through a resistor 24 and a second identical resistor 26 to ground. The resistors 24, 26, and 14 are all identical, each having a resistance of about 250 ohms.

Whenever the ignition switch 20 is closed, the equal valued resistors 24 and 26 form a voltage divider and their junction 28 remains at approximately six volts. The LED 10, and additional LED 10a if employed, is coupled between the junctions 18 at its normal 6.9 volts and the junction 28 at its approximate 6. volts. Therefore, whenever the vehicle ignition switch is ON, there is insufficient voltage across an LED to permit conduction and the LED is OFF.

Whenever the ignition switch 20 is OFF, there is no current flow through the series diode 22 and resistor 24 and, since there is no current flow through the resistor 26, the voltage at the junction 28 momentarily drops to zero. The LED 10 is now coupled between junction 18 at 6.9 volts and junction 28 at zero volts and conducts to produce light.

Whenever LED 10 starts conducting, current flows from the battery 12 through the resistor 14, the LED 10, and resistor 26 to ground thereby placing the LED at the center of a voltage divider formed by the equal valued resistors 14, 26. The current thus raises the voltage at the junction 28 from its initial zero to a point approaching the 6.9 Zener voltage at junction 18, the point being the voltage at which the LED ceases conduction. When conduction ceases, the junction 28 again drops to zero voltage to re-establish the required igniting LED voltage. Thus the variations in voltage levels at the junction 28 caused by current flows through the resistor 28 and LED 10 will cause the LED to flash ON and OFF in a manner similar to the flashing of a conventional vehicle alarm system.

I claim:

1. A simulated vehicle alarm for producing a small flashing light from an LED mounted within a vehicle while the vehicle ignition switch is turned off, said simulated alarm comprising:
   a first resistive circuit coupled between the positive and negative terminals of a 12 volt vehicle battery, said first circuit having a first LED terminal maintained at a substantially constant voltage level above the conduction voltage level of the LED;
   a second circuit coupled between the positive terminal of the vehicle ignition switch and negative terminal of the vehicle battery, said second circuit having first and second equal valued resistors in series, the junction of said first and second resistors forming a second LED terminal; and
   the LED coupled between said first and second LED terminals.

2. The simulated vehicle alarm claimed in claim 1 wherein said conduction voltage level of said LED is between 2-5 volts.

3. The simulated vehicle alarm claimed in claim 2 wherein said first LED terminal is maintained at the substantially constant voltage level of 6.9 volts by a Zener diode.

4. The simulated vehicle alarm claimed in claim 1 wherein a closure of said ignition switch applies current through said second circuit and maintains the voltage level of said second LED terminal at approximately the voltage level of said first LED terminal to prevent flashing of said LED.

5. The simulated vehicle alarm claimed in claim 1 wherein an opening of said ignition switch disables a portion of said second circuit to cause the coupling of said second LED terminal to said negative battery terminal through the second one of said equal valued resistors.

* * * * *